US008596684B2

(12) United States Patent
Ridgway et al.

(10) Patent No.: US 8,596,684 B2
(45) Date of Patent: *Dec. 3, 2013

(54) HORIZONTAL HYBRID COLLAPSING STEERING COLUMN

(75) Inventors: Jason R. Ridgway, Bay City, MI (US); Richard K. Riefe, Saginaw, MI (US); Sam L. Scrivener, Durand, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,496

(22) Filed: Apr. 4, 2011

(65) Prior Publication Data

US 2011/0239807 A1    Oct. 6, 2011

Related U.S. Application Data

(62) Division of application No. 11/101,953, filed on Apr. 8, 2005, now Pat. No. 7,942,446.

(60) Provisional application No. 60/567,108, filed on Apr. 30, 2004.

(51) Int. Cl.
    *B62D 1/187*    (2006.01)
    *B62D 1/18*     (2006.01)

(52) U.S. Cl.
    USPC .............................. 280/777; 280/775; 74/493

(58) Field of Classification Search
    USPC .............................. 280/775, 776, 777; 74/493
    See application file for complete search history.

(56) References Cited

U.S. PATENT DOCUMENTS

| | | | |
|---|---|---|---|
| 3,434,367 A | 3/1969 | Renneker et al. |
| 3,504,569 A | 4/1970 | Zoltok |
| 3,505,897 A | 4/1970 | Scheffler et al. |
| 3,521,724 A | 7/1970 | Mayer |
| 3,556,550 A | 1/1971 | Franchini |
| 3,803,939 A | 4/1974 | Schenten |
| 3,822,608 A | 7/1974 | Murase et al. |
| 3,923,319 A | 12/1975 | Nonaka et al. |
| 3,945,662 A | 3/1976 | Murase et al. |
| 3,948,539 A | 4/1976 | Murase et al. |
| 4,022,495 A | 5/1977 | Pizzocri |
| 4,046,024 A | 9/1977 | Broucksou |
| 4,228,695 A | 10/1980 | Trevisson et al. |

(Continued)

FOREIGN PATENT DOCUMENTS

| | | |
|---|---|---|
| DE | 2431883 A1 | 1/1975 |
| EP | 1221404 A2 | 7/2002 |

(Continued)

*Primary Examiner* — Ruth Ilan
*Assistant Examiner* — Barry Gooden, Jr.
(74) *Attorney, Agent, or Firm* — Cantor Colburn LLP

(57) ABSTRACT

The invention provides a steering column assembly having a steering column extending between a pivot end and a steering wheel supporting end. The steering wheel supporting end is operable to engage a steering wheel. The steering column is moveable along a collapse path in response to an impacting force acting on the steering wheel supporting end. The steering column includes a cam-follower surface in fixed relation to the steering wheel supporting end. The steering column assembly also includes a cam surface spaced from the steering column and slidably engaging the cam-follower surface. The cam surface and the cam-follower surface cooperate during movement of the steering column along the collapse path to guide the steering column in rotation upwardly about the pivot end.

3 Claims, 7 Drawing Sheets

(56) References Cited

U.S. PATENT DOCUMENTS

| | | | |
|---|---|---|---|
| 4,325,268 A | 4/1982 | Benteler et al. | |
| 4,449,419 A | 5/1984 | Soler Bruguera | |
| 4,495,834 A | 1/1985 | Bauer et al. | |
| 4,616,522 A | 10/1986 | White et al. | |
| 5,024,118 A | 6/1991 | Khalifa et al. | |
| 5,082,311 A | 1/1992 | Melotik | |
| 5,181,435 A | 1/1993 | Khalifa et al. | |
| 5,390,956 A | 2/1995 | Thomas | |
| 5,476,283 A | 12/1995 | Elton | |
| 5,498,032 A | 3/1996 | Thomas | |
| 5,503,431 A | 4/1996 | Yamamoto | |
| 5,524,927 A | 6/1996 | Toussaint | |
| 5,595,399 A | 1/1997 | Fouquet et al. | |
| 5,609,063 A | 3/1997 | Hedderly et al. | |
| 5,802,926 A | 9/1998 | Thomas | |
| 6,032,981 A | 3/2000 | Imanishi et al. | |
| 6,149,196 A | 11/2000 | Guiard et al. | |
| 6,176,544 B1 | 1/2001 | Seksaria et al. | |
| 6,343,523 B1 | 2/2002 | Castellon | |
| 6,345,842 B1 | 2/2002 | Igarashi et al. | |
| 6,357,317 B1* | 3/2002 | Livengood et al. | 74/493 |
| 6,530,600 B1 | 3/2003 | Marxer et al. | |
| 6,595,079 B2 | 7/2003 | Duffy | |
| 6,604,439 B2 | 8/2003 | Gaukel | |
| 6,641,166 B2 | 11/2003 | Browne et al. | |
| 6,685,225 B2 | 2/2004 | Hancock et al. | |
| 6,722,226 B2 | 4/2004 | Neag et al. | |
| 7,484,430 B2* | 2/2009 | Schulz | 74/493 |
| 7,506,893 B2* | 3/2009 | Higashino et al. | 280/776 |
| 2002/0020245 A1 | 2/2002 | Gaukel | |
| 2002/0026848 A1* | 3/2002 | Kurita | 74/493 |
| 2002/0140219 A1* | 10/2002 | Tsunoda et al. | 280/779 |
| 2003/0000330 A1* | 1/2003 | Murakami et al. | 74/492 |
| 2003/0057693 A1 | 3/2003 | Neag et al. | |
| 2003/0094063 A1* | 5/2003 | Cooper et al. | 74/493 |
| 2003/0209102 A1* | 11/2003 | Murakami et al. | 74/493 |
| 2003/0227163 A1* | 12/2003 | Murakami et al. | 280/777 |
| 2004/0239090 A1 | 12/2004 | Riefe et al. | |
| 2005/0029791 A1 | 2/2005 | Davis et al. | |
| 2005/0029794 A1 | 2/2005 | Riefe et al. | |
| 2005/0151361 A1* | 7/2005 | Hori et al. | 280/775 |
| 2006/0151984 A1* | 7/2006 | Higashino et al. | 280/775 |
| 2006/0151985 A1* | 7/2006 | Li et al. | 280/775 |
| 2006/0156854 A1* | 7/2006 | Sawada et al. | 74/493 |
| 2006/0162989 A1* | 7/2006 | Yamada | 180/444 |
| 2006/0207380 A1* | 9/2006 | Higashino | 74/493 |
| 2008/0224459 A1* | 9/2008 | Oh | 280/777 |
| 2008/0231032 A1* | 9/2008 | Oh | 280/775 |
| 2009/0145257 A1* | 6/2009 | Miyawaki et al. | 74/493 |

FOREIGN PATENT DOCUMENTS

| | | |
|---|---|---|
| EP | 0805093 B1 | 4/2003 |
| GB | 1502647 A | 3/1978 |
| WO | 9858831 A1 | 12/1998 |

\* cited by examiner

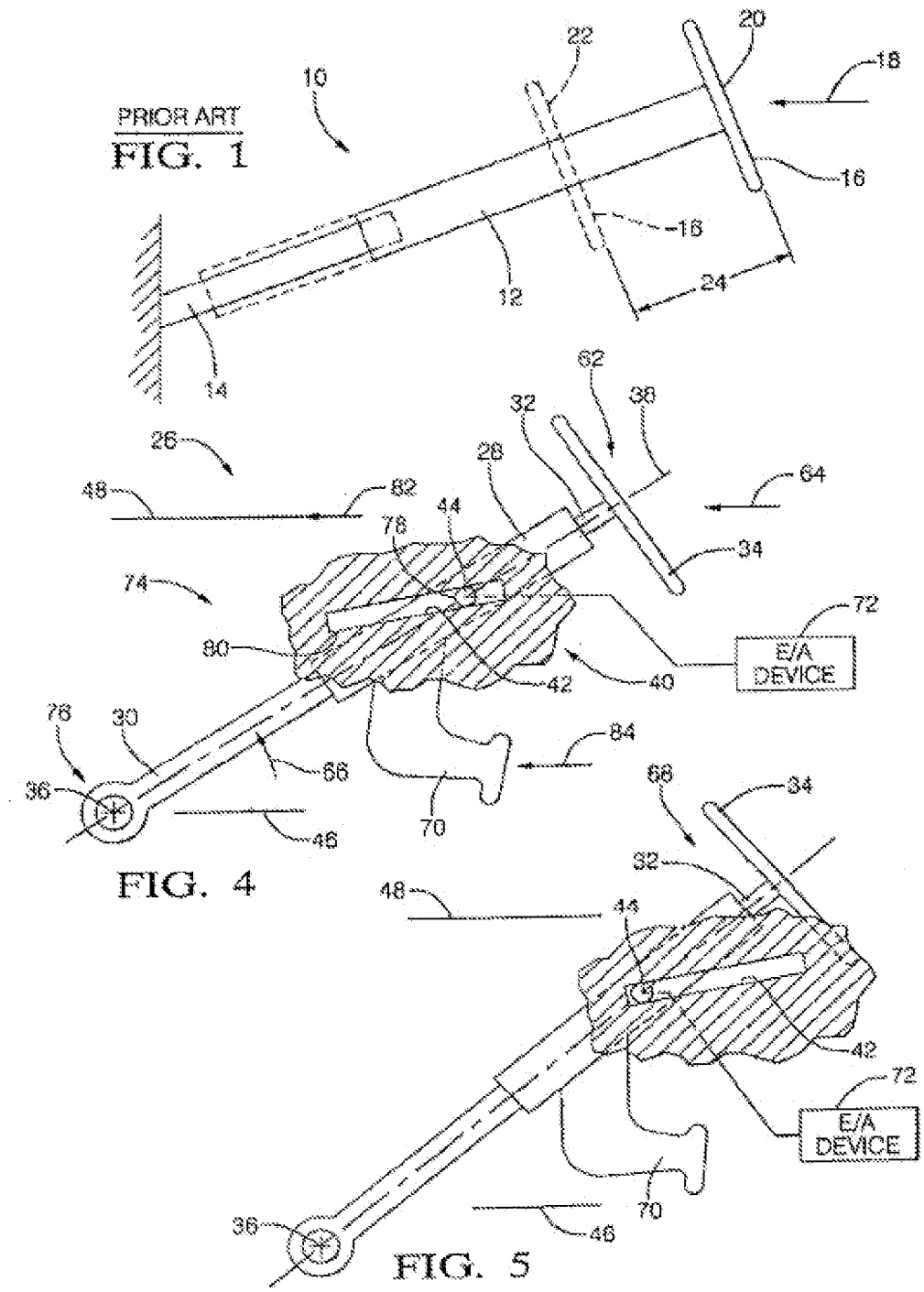

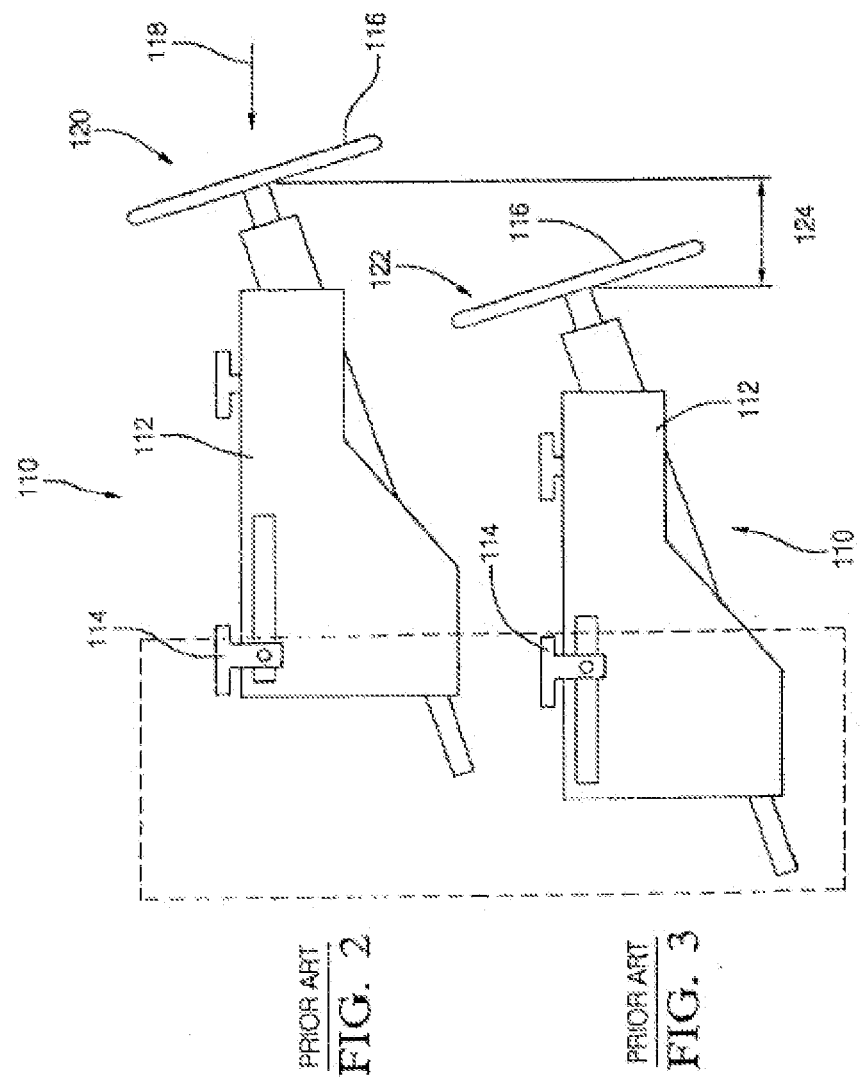

HORIZONTAL HYBRID COLLAPSING STEERING COLUMN

CROSS-REFERENCE TO RELATED APPLICATION

This patent application claims the benefit of U.S. Non-Provisional patent application Ser. No. 11/101,953, filed Apr. 8, 2005, which claims the benefit of U.S. Provisional Patent Application Ser. No. 60/567,108, filed Apr. 30, 2004, the disclosure of each are incorporated by reference herein, in their entirety.

FIELD OF THE INVENTION

The invention relates to a steering column and more particularly to a steering column operable to collapse in response to an impacting force.

BACKGROUND OF THE INVENTION

Automotive steering column assemblies often include translating and/or deformable members that, in the event of a frontal collision, absorb the driver's energy, thus reducing the forces experienced by the driver. To optimize the column assembly's energy absorption performance, manufacturers have developed two primary methods of allowing the column assembly to translate during a frontal collision. The first method is to allow the column assembly to collapse along the center line of the steering shaft, best shown in FIG. 1. A steering column assembly 10 includes first and second members 12, 14 telescopically engaged with respect to one another. The first and second members 12, 14 support a steering wheel 16. The first and second members 12, 14 telescopically collapse along the longitudinal axis of the column assembly in response to an impacting force 18 acting on the steering column 16. The steering wheel 16 moves from a first position 20 to a second position 20 (shown in phantom) in response to the impacting force 18, traveling a distance 24.

Typically, the steering shaft is at a 18-22 degree angle from horizontal. This has been the industry standard since it is easily packaged and allows for an internally collapsing column structure. Although column assemblies that collapse along the center line of the steering shaft offer certain benefits, there are disadvantages. One of the major disadvantages is that the relative position between the driver's chest and the airbag changes as the column collapses. Another disadvantage is that the collapse resistance of the column assembly is at an angle relative to the driver's input load.

The second method for allowing the column assembly to translate during a frontal collision is to allow the column assembly to horizontally translate, best shown in FIG. 2. A steering column assembly 110 includes first and second members 112, 114. The first and second members 112, 114 are slidably engaged with respect to one another and support a steering wheel 116. In response to an impacting force 118, the first member 112 and steering wheel 116 move relative to the second member 114. The steering wheel 116 moves from a first position 120 to a second position 122, traveling a distance 124. This allows the driver's input load and the column collapse resistance to be aligned. However, the major disadvantage of the horizontally collapsing column assembly is the inability to internally collapse the steering column structure. This means that the vehicle manufacturer must leave space available for the column assembly to translate during collision.

SUMMARY OF THE INVENTION

The invention provides a steering column assembly having a steering column extending between a pivot end and a steering wheel supporting end. The steering wheel supporting end is operable to engage a steering wheel. The steering column is moveable along a collapse path in response to an impacting force acting on the steering wheel supporting end. The steering column includes a cam-follower surface in fixed relation to the steering wheel supporting end. The steering column assembly also includes a cam surface spaced from the steering column and slidably engaging the cam-follower surface. The cam surface and the cam-follower surface cooperate during movement of the steering column along the collapse path to guide the steering column in rotation upwardly about the pivot end.

BRIEF DESCRIPTION OF THE DRAWINGS

Advantages of the exemplary embodiments of the invention will be readily appreciated as the same becomes better understood by reference to the following detailed description when considered in connection with the accompanying drawings wherein:

FIG. 1 is a steering column assembly disclosed in the prior art and collapsible along a center line of a steering shaft;

FIG. 2 is a steering column assembly disclosed in the prior art and operable to horizontally translate in response to a frontal collision, wherein the steering column assembly is shown prior to the frontal collision;

FIG. 3 is the steering column assembly shown in FIG. 2 after the frontal collision;

FIG. 4 is a schematic view of a steering column assembly according to a first exemplary embodiment of the invention before a frontal collision according to the exemplary embodiment of the invention;

FIG. 5 is the steering column assembly shown in FIG. 4 after the frontal collision;

DETAILED DESCRIPTION

Figure 6:
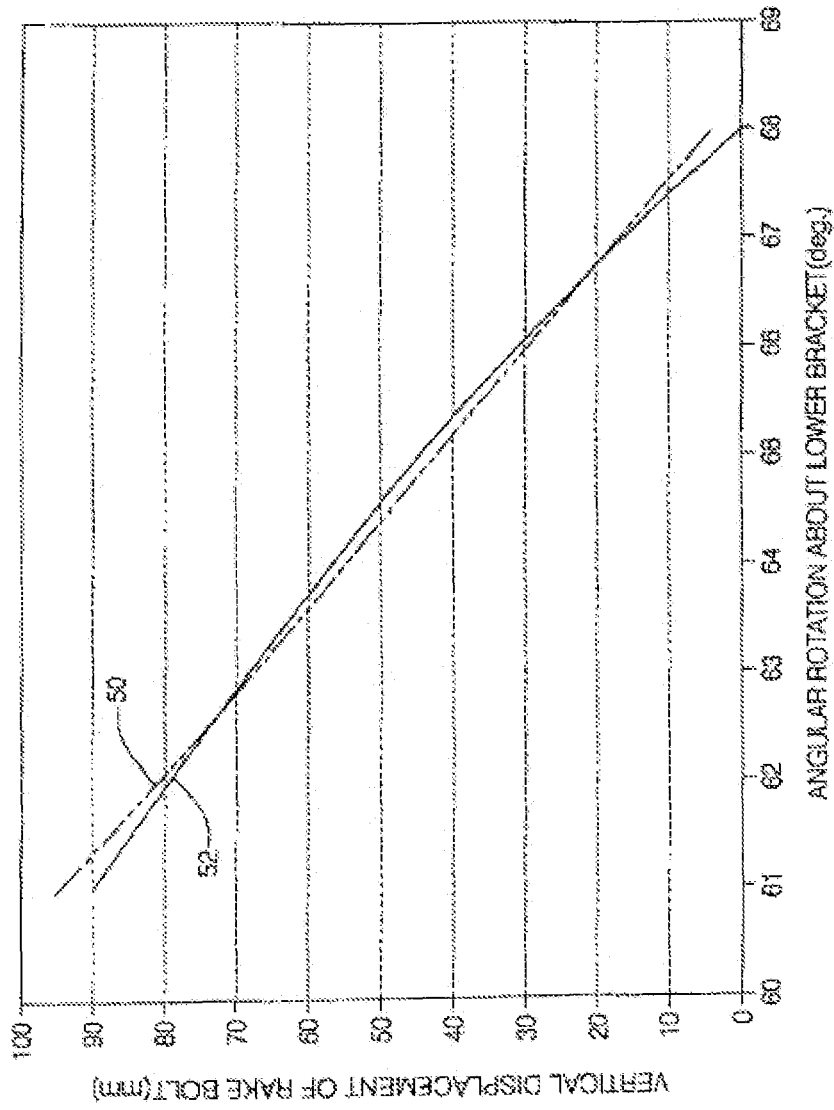
FIG. 6 is a graph illustrating the relationship between vertical displacement of a rake bolt and angular rotation of the steering column assembly about a lower bracket during telescopic collapse of the exemplary steering column assembly.

A plurality of different embodiments of the invention are shown in the Figures of the application. Similar features are shown in the various embodiments of the invention. Similar features have been numbered with a common two-digit reference numeral and have been differentiated by a third digit placed before the two common digits. Also, to enhance consistency, features in any particular drawing share the same third digit designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to FIGS. 4 and 5, in a first exemplary embodiment of the invention, a steering column assembly 26 includes a steering column 74 with first and second members 28, 30 telescopically engaged with one another. The first member 28 defines a steering wheel supporting end 32 for supporting a steering wheel 34. The second member 30 defines a pivot end 76 with a pivot point 36. The steering column assembly 26 defines an axis 38 rotatable about the pivot point 36. The steering column assembly 26 telescopically collapses along the axis 38 in response to an impacting force 64 acting on the steering wheel 34. The axis 38 defines a collapse path.

The invention also includes a guide 40 for guiding movement of the steering column assembly 26 during telescopic collapse. The guide 40 guides the steering column assembly 26 in rotation upwardly about the pivot point 36 in response to telescopic collapse along the axis 38. In the first exemplary embodiment of the invention, the guide 40 is attachable to the vehicle and defines a slot 42, the slot 42 defining a cam surface 80. The first member includes a second portion 44 that is received in the slot 42. The second portion 44 can be pin-like and fixedly associated with the first member 28 and defines a cam-follower surface 78. In alternative embodiments of the invention, the guide 40 could define a single cam surface that guides movement of the first member 28 during telescopic collapse rather than a closed slot.

Figure 9:
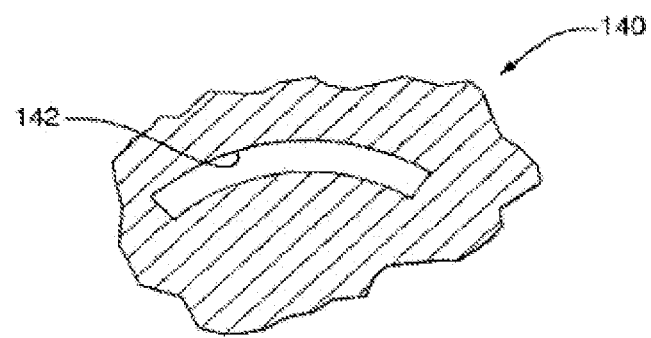
FIG. 9 is a schematic view of a guide according to a second exemplary embodiment of the invention.

In FIGS. 4 and 5 of the exemplary embodiment, the slot 42 appears straight and the invention can be practiced with a perfectly straight slot 42. However, in the preferred embodiment of the invention, slot 42 is arcuate. In FIG. 9, in a second exemplary embodiment of the invention, a guide 140 is shown in exaggerated form, having an arcuate slot 142. The shape of slot 142 can be selected based on the operating environment of the steering column assembly 26 to enhance the likelihood that the path of travel of the steering column assembly is aligned with the impact force. It can be desirable to guide the steering wheel supporting end 32 along an arcuate path of movement or a straight path of movement. For example, when the driver is wearing a seat belt during an impact situation, the path of movement for the driver may define an arc about the seat belt. In other vehicles, the path of movement for the driver may define an arc over a first distance of movement and be substantially straight over a second distance of movement. The guide slot 142 can be designed in response to the expected path of movement for the driver in an impact situation and the expected path may be different in different operating environments.

In charts 1 and 2 provided immediately below, data corresponding to the shape of the exemplary slot 42 is provided. In chart 1, the value A represents the distance in millimeters between the pivot point 36 and the second portion 44 prior to an impacting force acting on the steering wheel 34. The value B represents the vertical distance in millimeters between a horizontal plane 46 and a horizontal plane 48. The pivot point 36 is disposed in the horizontal plane 46 and the steering wheel supporting end 32 is disposed in the horizontal plane 48. The value C represents the horizontal distance in millimeters between the pivot point 36 and the steering wheel supporting end 32. The value D represents the distance in millimeters between the second portion 44 and the steering wheel supporting end 32 along the axis 38. In chart 2, the value X represents an arbitrary change in position of the steering column assembly 26. Theta (rad) and Theta 1 (deg) correspond to one another and represent the angle between the axis 38 and the horizontal plane 48. Theta 2 (deg) represents the angle between the horizontal plane 46 and the axis 38. The value Z represents the horizontal distance of travel in millimeters by the second portion 44 from a starting position in the direction of the pivot point 36. The value V represents the vertical distance of travel in millimeters by the second portion 44 from a starting point in the direction of the pivot point 36. The value Y represents the amount of telescopic collapse in millimeters of the first and second members 28, 30 relative to one another.

TABLE 1

| | |
|---|---|
| A | 300 |
| B | 150 |
| C | 370.81 |
| D | 100 |

TABLE 2

| X | Theta (rad) | Theta1 (deg) | Theta2 (deg) | Z | V | Y |
|---|---|---|---|---|---|---|
| 0 | 0.384 | 22.026 | 67.974 | 0.000 | 0.000 | 0.000 |
| 1 | 0.385 | 22.080 | 67.920 | 0.965 | 0.087 | 0.927 |
| 2 | 0.386 | 22.134 | 67.866 | 1.929 | 0.175 | 1.853 |
| 3 | 0.387 | 22.188 | 67.812 | 2.893 | 0.262 | 2.779 |
| 4 | 0.388 | 22.243 | 67.757 | 3.857 | 0.351 | 3.705 |
| 5 | 0.389 | 22.298 | 67.702 | 4.821 | 0.439 | 4.631 |
| 6 | 0.390 | 22.353 | 67.647 | 5.785 | 0.528 | 5.556 |
| 7 | 0.391 | 22.408 | 67.592 | 6.748 | 0.618 | 6.480 |
| 8 | 0.392 | 22.464 | 67.536 | 7.711 | 0.707 | 7.405 |
| 9 | 0.393 | 22.520 | 67.480 | 8.673 | 0.797 | 8.329 |
| 10 | 0.394 | 22.576 | 67.424 | 9.636 | 0.888 | 9.252 |
| 11 | 0.395 | 22.632 | 67.368 | 10.598 | 0.979 | 10.175 |
| 12 | 0.396 | 22.689 | 67.311 | 11.560 | 1.070 | 11.098 |
| 13 | 0.397 | 22.746 | 67.254 | 12.521 | 1.162 | 12.021 |
| 14 | 0.398 | 22.803 | 67.197 | 13.483 | 1.254 | 12.943 |
| 15 | 0.399 | 22.861 | 67.139 | 14.444 | 1.346 | 13.864 |
| 16 | 0.400 | 22.918 | 67.082 | 15.405 | 1.439 | 14.786 |
| 17 | 0.401 | 22.977 | 67.023 | 16.365 | 1.533 | 15.707 |
| 18 | 0.402 | 23.035 | 66.965 | 17.325 | 1.626 | 16.627 |
| 19 | 0.403 | 23.093 | 66.907 | 18.285 | 1.721 | 17.547 |
| 20 | 0.404 | 23.152 | 66.848 | 19.245 | 1.815 | 18.467 |
| 21 | 0.405 | 23.212 | 66.788 | 20.204 | 1.910 | 19.386 |
| 22 | 0.406 | 23.271 | 66.729 | 21.163 | 2.005 | 20.305 |
| 23 | 0.407 | 23.331 | 66.669 | 22.122 | 2.101 | 21.223 |
| 24 | 0.408 | 23.391 | 66.609 | 23.081 | 2.197 | 22.141 |
| 25 | 0.409 | 23.451 | 66.549 | 24.039 | 2.294 | 23.059 |
| 26 | 0.410 | 23.512 | 66.488 | 24.996 | 2.391 | 23.976 |
| 27 | 0.411 | 23.573 | 66.427 | 25.954 | 2.489 | 24.893 |
| 28 | 0.412 | 23.634 | 66.366 | 26.911 | 2.587 | 25.809 |
| 29 | 0.414 | 23.696 | 66.304 | 27.868 | 2.685 | 26.725 |
| 30 | 0.415 | 23.757 | 66.243 | 28.825 | 2.784 | 27.641 |
| 31 | 0.416 | 23.820 | 66.180 | 29.781 | 2.883 | 28.556 |
| 32 | 0.417 | 23.882 | 66.118 | 30.737 | 2.983 | 29.470 |
| 33 | 0.418 | 23.945 | 66.055 | 31.692 | 3.083 | 30.385 |
| 34 | 0.419 | 24.008 | 65.992 | 32.648 | 3.183 | 31.298 |
| 35 | 0.420 | 24.071 | 65.929 | 33.603 | 3.284 | 32.212 |
| 36 | 0.421 | 24.135 | 65.865 | 34.557 | 3.386 | 33.124 |
| 37 | 0.422 | 24.199 | 65.801 | 35.512 | 3.488 | 34.037 |
| 38 | 0.423 | 24.263 | 65.737 | 36.466 | 3.590 | 34.949 |
| 39 | 0.425 | 24.328 | 65.672 | 37.419 | 3.693 | 35.860 |
| 40 | 0.426 | 24.393 | 65.607 | 38.372 | 3.796 | 36.771 |
| 41 | 0.427 | 24.458 | 65.542 | 39.325 | 3.900 | 37.682 |
| 42 | 0.428 | 24.524 | 65.476 | 40.278 | 4.004 | 38.592 |
| 43 | 0.429 | 24.590 | 65.410 | 41.230 | 4.109 | 39.501 |

TABLE 2-continued

| X | Theta (rad) | Theta1 (deg) | Theta2 (deg) | Z | V | Y |
|---|---|---|---|---|---|---|
| 44 | 0.430 | 24.656 | 65.344 | 42.182 | 4.214 | 40.410 |
| 45 | 0.431 | 24.723 | 65.277 | 43.133 | 4.320 | 41.319 |
| 46 | 0.433 | 24.790 | 65.210 | 44.084 | 4.426 | 42.227 |
| 47 | 0.434 | 24.857 | 65.143 | 45.035 | 4.533 | 43.135 |
| 48 | 0.435 | 24.925 | 65.075 | 45.985 | 4.640 | 44.042 |
| 49 | 0.436 | 24.993 | 65.007 | 46.935 | 4.747 | 44.948 |
| 50 | 0.437 | 25.061 | 64.939 | 47.885 | 4.855 | 45.855 |
| 51 | 0.439 | 25.130 | 64.870 | 48.834 | 4.964 | 46.760 |
| 52 | 0.440 | 25.199 | 64.801 | 49.782 | 5.073 | 47.665 |
| 53 | 0.441 | 25.268 | 64.732 | 50.731 | 5.183 | 48.570 |
| 54 | 0.442 | 25.338 | 64.662 | 51.679 | 5.293 | 49.474 |
| 55 | 0.443 | 25.408 | 64.592 | 52.626 | 5.403 | 50.377 |
| 56 | 0.445 | 25.479 | 64.521 | 53.573 | 5.515 | 51.281 |
| 57 | 0.446 | 25.550 | 64.450 | 54.520 | 5.626 | 52.183 |
| 58 | 0.447 | 25.621 | 64.379 | 55.467 | 5.738 | 53.085 |
| 59 | 0.448 | 25.692 | 64.308 | 56.412 | 5.851 | 53.986 |
| 60 | 0.450 | 25.764 | 64.236 | 57.358 | 5.964 | 54.887 |
| 61 | 0.451 | 25.837 | 64.163 | 58.303 | 6.078 | 55.788 |
| 62 | 0.452 | 25.909 | 64.091 | 59.248 | 6.192 | 56.687 |
| 63 | 0.453 | 25.983 | 64.017 | 60.192 | 6.307 | 57.587 |
| 64 | 0.455 | 26.056 | 63.944 | 61.135 | 6.422 | 58.485 |
| 65 | 0.456 | 26.130 | 63.870 | 62.079 | 6.538 | 59.383 |
| 66 | 0.457 | 26.204 | 63.796 | 63.022 | 6.654 | 60.281 |
| 67 | 0.459 | 26.279 | 63.721 | 63.964 | 6.771 | 61.178 |
| 68 | 0.460 | 26.354 | 63.646 | 64.906 | 6.888 | 62.074 |
| 69 | 0.461 | 26.429 | 63.571 | 65.847 | 7.006 | 62.970 |
| 70 | 0.463 | 26.505 | 63.495 | 66.788 | 7.125 | 63.865 |
| 71 | 0.464 | 26.582 | 63.418 | 67.729 | 7.244 | 64.760 |
| 72 | 0.465 | 26.658 | 63.342 | 68.669 | 7.364 | 65.654 |
| 73 | 0.467 | 26.735 | 63.265 | 69.608 | 7.484 | 66.547 |
| 74 | 0.468 | 26.813 | 63.187 | 70.548 | 7.605 | 67.440 |
| 75 | 0.469 | 26.891 | 63.109 | 71.486 | 7.726 | 68.332 |
| 76 | 0.471 | 26.969 | 63.031 | 72.424 | 7.848 | 69.224 |
| 77 | 0.472 | 27.048 | 62.952 | 73.362 | 7.970 | 70.115 |
| 78 | 0.473 | 27.127 | 62.873 | 74.299 | 8.093 | 71.005 |
| 79 | 0.475 | 27.207 | 62.793 | 75.235 | 8.217 | 71.895 |
| 80 | 0.476 | 27.287 | 62.713 | 76.171 | 8.341 | 72.784 |
| 81 | 0.478 | 27.367 | 62.633 | 77.107 | 8.466 | 73.672 |
| 82 | 0.479 | 27.448 | 62.552 | 78.042 | 8.591 | 74.560 |
| 83 | 0.480 | 27.530 | 62.470 | 78.976 | 8.717 | 75.447 |
| 84 | 0.482 | 27.611 | 62.389 | 79.910 | 8.844 | 76.334 |
| 85 | 0.483 | 27.694 | 62.306 | 80.844 | 8.971 | 77.219 |
| 86 | 0.485 | 27.776 | 62.224 | 81.777 | 9.099 | 78.105 |
| 87 | 0.486 | 27.860 | 62.140 | 82.709 | 9.227 | 78.989 |
| 88 | 0.488 | 27.943 | 62.057 | 83.640 | 9.356 | 79.873 |
| 89 | 0.489 | 28.027 | 61.973 | 84.572 | 9.486 | 80.756 |
| 90 | 0.491 | 28.112 | 61.888 | 85.502 | 9.616 | 81.638 |
| 91 | 0.492 | 28.197 | 61.803 | 86.432 | 9.747 | 82.520 |
| 92 | 0.494 | 28.282 | 61.718 | 87.362 | 9.879 | 83.401 |
| 93 | 0.495 | 28.368 | 61.632 | 88.290 | 10.011 | 84.281 |
| 94 | 0.497 | 28.455 | 61.545 | 89.219 | 10.143 | 85.161 |
| 95 | 0.498 | 28.542 | 61.458 | 90.146 | 10.277 | 86.040 |
| 96 | 0.500 | 28.629 | 61.371 | 91.073 | 10.411 | 86.918 |
| 97 | 0.501 | 28.717 | 61.283 | 92.000 | 10.545 | 87.795 |
| 98 | 0.503 | 28.806 | 61.194 | 92.925 | 10.681 | 88.672 |
| 99 | 0.504 | 28.895 | 61.105 | 93.850 | 10.817 | 89.548 |
| 100 | 0.506 | 28.984 | 61.016 | 94.775 | 10.953 | 90.423 |

Figure 7:
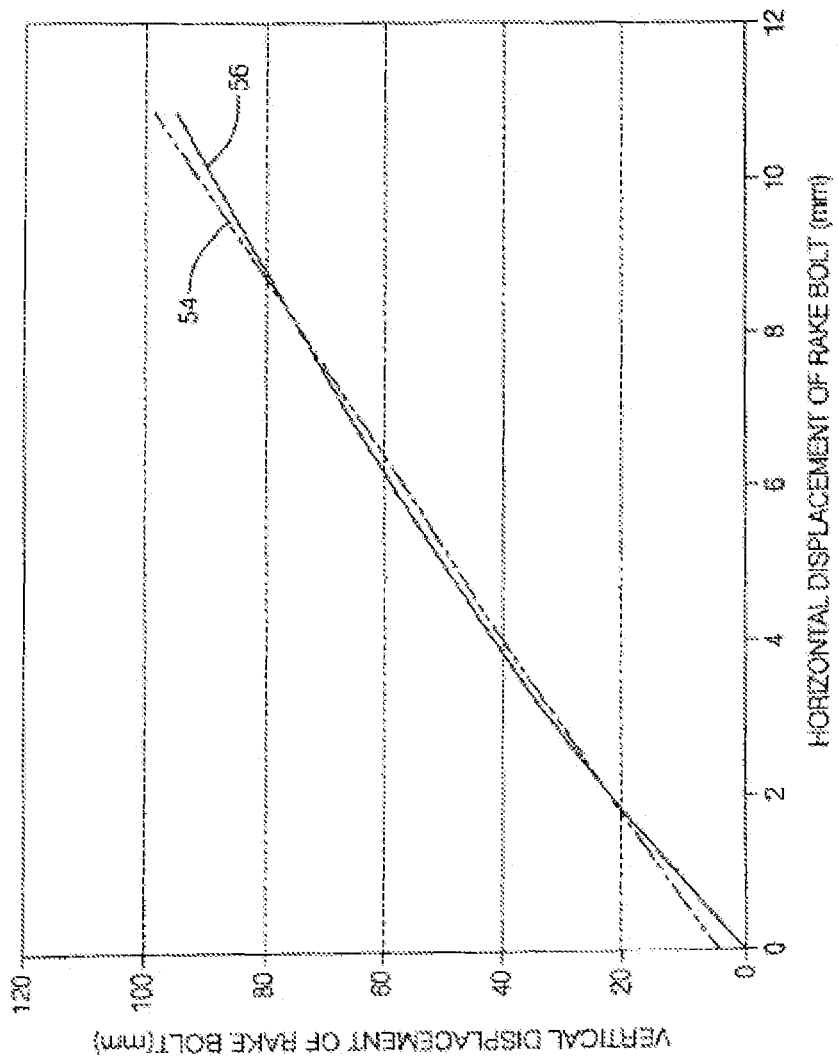
FIG. 7 is a graph illustrating the relationship between the vertical displacement of the rake bolt and horizontal displacement of the rake bolt during telescopic collapse of the exemplary steering column assembly.
Figure 8:
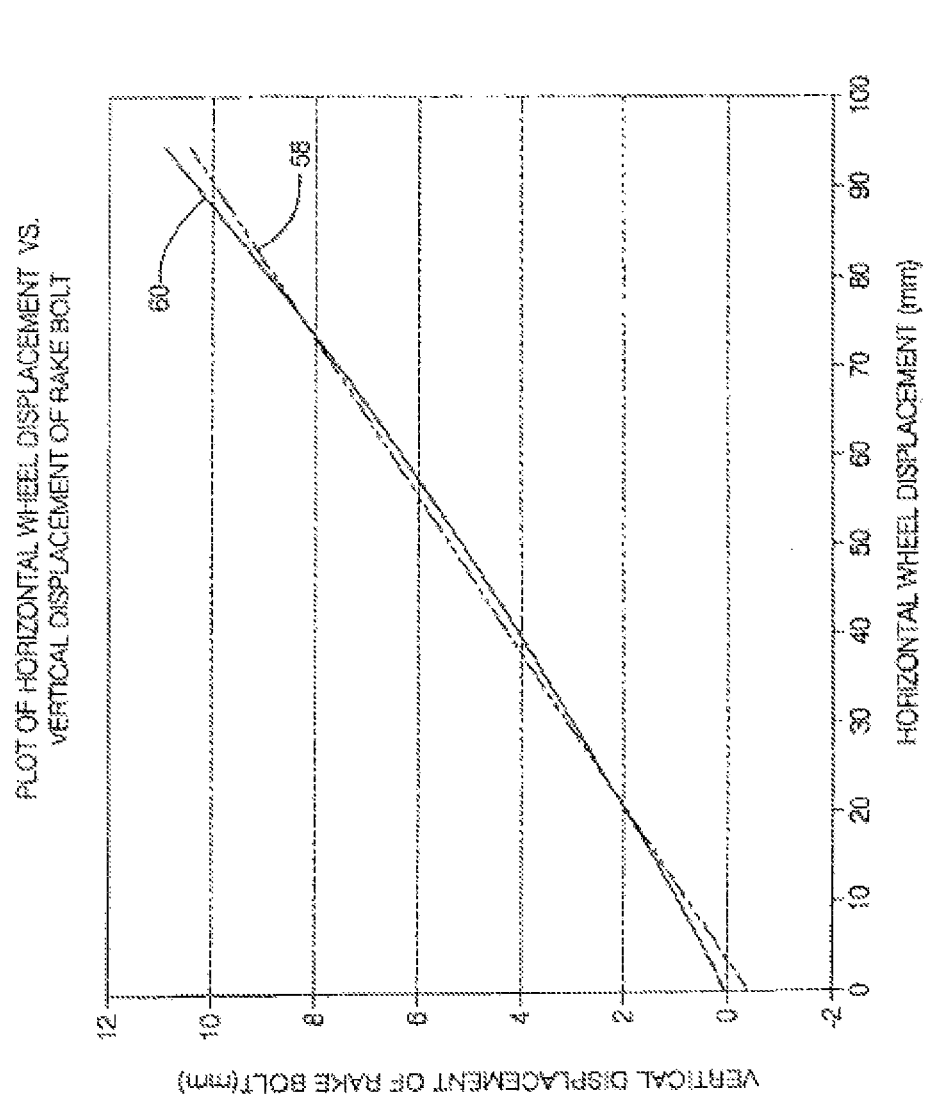
FIG. 8 is a graph illustrating the relationship between the vertical displacement of the rake bolt and horizontal displacement of a steering wheel during telescopic collapse of the exemplary steering column assembly.

In addition to the tables provided above, FIGS. 6-8 provide charts detailing exemplary dimensional data. In FIG. 6, the graph plots the vertical displacement of the second portion 44 or rake bolt in millimeters along the Y axis and the angular rotation of the steering column assembly 26 about the pivot point 36 or lower bracket in millimeters along the X axis. The line 50 is a straight reference line and the line 52 represents the exemplary dimensional data. FIG. 6 illustrates that a rate of vertical displacement of the second portion 44 decreases as the angle between the horizontal plane 46 and the axis 38 increases. FIG. 7 illustrates the movement of the second portion 44 in a vertical direction relative to the movement of the second portion 44 in the horizontal direction. The line 54 is a straight reference line and the line 56 represents the exemplary dimensional data. FIG. 8 illustrates the relationship between the movement of the second portion 44 and the vertical direction and the movement of the steering wheel supporting end 32 in the horizontal direction. The line 58 is a straight reference line and the line 60 represents exemplary dimensional data. The data in the tables and the charts demonstrates that the steering wheel supporting end 32 moves along the horizontal plane 48 as the steering column assembly 26 rotates about the pivot point 36.

Referring now to FIGS. 4 and 5, in operation, the steering wheel supporting end 32 and associated steering wheel 34 are disposed at a first position 62 prior to the impacting force 64 being directed to the steering wheel 34. In response to the impacting force 64, the first and second members 28, 30 telescopically collapse with respect to one another and the steering column assembly 26 rotates about the pivot point 36 in the angular direction 66. The first member 28 is guided in movement by the cooperation between the second portion 44 and the slot 42. The first member 28 is also guided in movement by being telescopically engaged with the second member 30. During movement of the steering column assembly 26, the steering wheel supporting end 32 moves substantially horizontal along a second path 82, such as along the horizontal plane 48. As a result, the impacting force 44 and the path of travel of the steering wheel 34 are substantially aligned. The steering wheel supporting end 32 moves along the horizontal plane 48 from the first position 62 to a second position 68 in response to the impacting force 64.

In alternative embodiments of the invention, a position along the axis 38 further from pivot point 36 than the steering wheel supporting end 32 may move along a horizontal path and the steering wheel supporting end 32 may move along a path that is at an angle to the horizontal plane 48. For example, it can be desirable to move an air bag, or inflatable restraint, associated with the steering wheel along a horizontal path. The inflatable restraint would be disposed at a position along the axis 38 further from pivot point 36 than the steering wheel supporting end 32. As used in the application relative to the first exemplary embodiment of the invention, the steering wheel supporting end is the position along the axis 38 that is desired to move in a horizontal plane. In the third exemplary embodiment of the invention discussed below, the steering wheel supporting end is moved along a path that is at an angle to the horizontal plane and a inflatable restraint is moved along a horizontal path.

The invention can also include a knee bolster 70 associated with the first member 28. The knee bolster 70 moves with the first member 28 along a horizontal third path 84 in response to the impacting force 64. Also, an energy absorbing ("E/A") device 72 may be coupled to the steering column assembly 26, as schematically shown in FIGS. 4 and 5, which is operative in response to the collapse to absorb all or part of the energy of impact to dissipate the energy in a controlled manner. Any E/A device suitable for usage with a collapsing first and second steering column members 28, 30 could be used and is contemplated with the scope of the present invention. The knee bolster 70 could employ the same or different E/A device as that of device 72.

Figure 10:
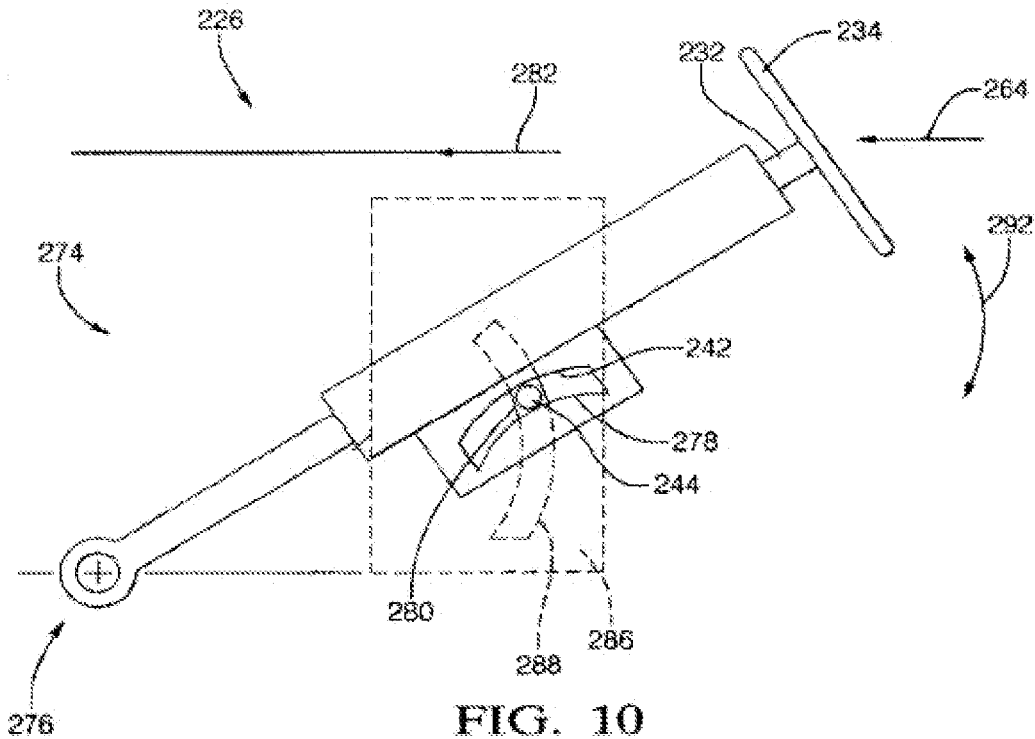
FIG. 10 is a schematic view of a steering column assembly according to a third exemplary embodiment of the invention before a frontal collision according to the exemplary embodiment of the invention.

Referring now to FIG. 10, in a third exemplary embodiment of the invention, a steering column assembly 226 having a steering column 274 extending between a pivot end 276 and a steering wheel supporting end 232. The steering wheel supporting end 232 is operable to engage a steering wheel 234. The steering column 274 is moveable along a collapse path in response to an impacting force 264 acting on the steering wheel supporting end 232. The steering column 274 includes a cam-follower surface 278 in fixed relation to the steering wheel supporting end 232. The steering column assembly 226 also includes a cam surface 280 spaced from the steering column 274 and slidably engaging the cam-follower surface 278. The cam surface 280 and the cam-follower surface 278 cooperate during movement of the steering column 274 along the collapse path to guide the steering column 274 in rotation upwardly about the pivot end 276.

The cam surface 280 is a rake bolt 244. The cam-follower surface 278 is a first arcuate slot 242 receiving the rake bolt 244. The cam surface 280 and the cam-follower surface 278 cooperate during movement of the steering column 274 along the collapse path to move the steering wheel supporting end 232 along a second path 282 extending substantially parallel to the impacting force 264.

The steering column assembly 226 is adjustable in raking movement 292. A rake bracket 286 (shown in phantom) having a second arcuate slot 288 receives the rake bolt 244. The rake bolt 244 and the second arcuate slot 288 cooperate to guide the steering column 274 in raking adjustment and are fixed relative to one another during movement of the steering column 274 along the collapse path. The steering column assembly 226 can also include a locking mechanism to selectively lock the steering column 274 relative to the rake bracket 286, such as shown in U.S. Pat. Nos. 6,616,185 and 6,659,504, which are hereby incorporated by reference.

Figure 11:
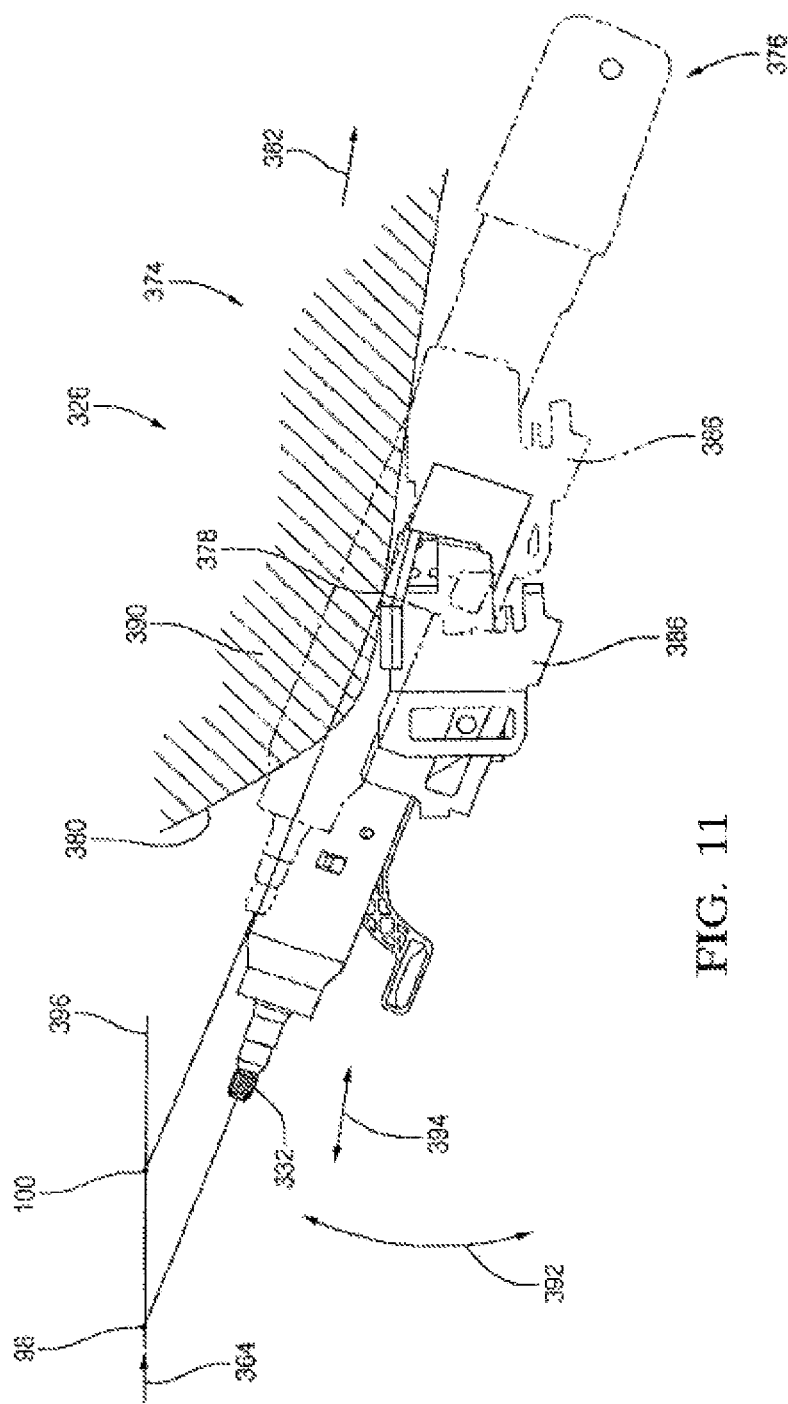
FIG. 11 a schematic view of a steering column assembly according to a fourth exemplary embodiment of the invention before a frontal collision according to the exemplary embodiment of the invention shown in solid line and shown after a frontal collision in phantom.

Referring now to FIG. 11, in a fourth exemplary embodiment of the invention, a steering column assembly 326 having a steering column 374 extending between a pivot end 376 and a steering wheel supporting end 332. The steering wheel supporting end 332 is operable to engage a steering wheel (not shown). The steering column 374 is moveable along a collapse path in response to an impacting force 364 acting on the steering wheel supporting end 332. The steering column 374 includes a cam-follower surface 378 in fixed relation to the steering wheel supporting end 332. The steering column assembly 326 also includes a cam surface 380 spaced from the steering column 374 and slidably engaging the cam-follower surface 378. The cam surface 380 and the cam-follower surface 378 cooperate during movement of the steering column 374 along the collapse path to guide the steering column 374 in rotation upwardly about the pivot end 376.

The cam surface 380 is an instrument panel support structure 390 sloping downwardly along the collapse path toward the pivot end 376. The cam-follower surface 278 is defined by a rake bracket 386. The rake bracket 386 selectively fixedly engageable with the steering column 374. The cam surface 380 and the cam-follower surface 378 cooperate during movement of the steering column 374 along the collapse path to move the steering wheel supporting end 332 along a second path 382 extending substantially parallel to the impacting force 364. In alternative embodiments of the invention, the cam surface 380 could be defined by any structure that is fixed relative to the vehicle while the rake bracket 386 moves during telescopic collapse of the steering column assembly 326. For example, the cam surface 380 could be defined by a bracket fixed to the steering column assembly 326 during normal vehicle handling and fixed to the vehicle during normal vehicle handling and during an impact situation.

The steering column assembly 326 is adjustable in raking movement 392 and adjustable in telescoping movement 394. The steering column assembly 326 can also include a locking mechanism to selectively lock the steering column 274 relative to the rake bracket 286, such as shown in U.S. Pat. Nos. 6,616,185 and 6,659,504, which are hereby incorporated by reference. FIG. 11 also shows a fourth path 396 of movement of a centerline of an inflatable restraint (not shown). The impacting force 364 is spaced from the steering wheel supporting end 332, striking the inflatable restraint. A first position 98 along the path 396 corresponds to the position of the inflatable restraint prior to application of the impacting force 364. A second position 100 along the path 396 corresponds to the position of the inflatable restraint subsequent to application of the impacting force 364.

The exemplary embodiments of the invention offer a safety and packaging improvement over the prior art. The exemplary embodiments includes a column assembly that translates generally horizontally along a collapse path different than that of the longitudinal axis of the column assembly and also internally collapses. This allows the relative position of the airbag to be maintained, as well as allows the driver's input force and the column collapse resistance to be more closely aligned in the same plane. Also, the invention allows the column assembly to be more easily packaged. In the exemplary embodiments of the invention, a column assembly rotates about a lower mounting bracket as it internally collapses. The collapse of the column assembly is guided such that as the column collapses the center line of the airbag remains in the same generally horizontal plane. Another advantage of the exemplary embodiments is that the column assembly is prevented from dropping and injuring the driver after the application of the impacting force. The column assembly according to the invention may advantageously be used in combination with any suitable energy absorbing device to manage the dissipation of energy through controlled collapse of the column. In other operating environments and in other forms, the invention can provide different and/or additional advantages.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

Having thus described the invention, it is claimed:
1. A steering column assembly comprising:
a steering column including a first member having a steering wheel supporting end operable to engage a steering wheel and a second member telescopically engaged with said first member and extending to a pivot end and being moveable along a first predetermined telescoping collapse path in response to an impacting force acting on said steering wheel supporting end and having a cam-follower surface in fixed relation to said steering wheel supporting end; and
a cam surface spaced from said steering column and slidably engaging said cam-follower surface, said cam surface and said cam-follower surface configured to cooperate during movement of said steering column to define a second predetermined substantially horizontal collapse path in continuous fixed relation to said first predetermined telescoping collapse path so as to guide said steering column in rotation upwardly about said pivot end in response to movement of said steering wheel supporting end toward said pivot end, said cam surface being further defined as a rake bolt, said cam-follower surface being further defined as a first arcuate slot, said first arcuate slot receiving said rake bolt;
wherein said second predetermined substantially horizontal collapse path is disposed such that the steering wheel supporting end translates in a substantially horizontal direction as said steering wheel supporting end moves toward said pivot end.

2. The steering column assembly of claim 1, further comprising:

a rake bracket having a second arcuate slot receiving said rake bolt wherein said rake bolt and said second arcuate slot cooperate to guide said steering column in raking adjustment and are fixed relative to one another during movement of said steering column along one of said first predetermined telescoping collapse path and said second predetermined substantially horizontal collapse paths.

3. A steering column assembly comprising:

a steering column including a first member having a steering wheel supporting end operable to engage a steering wheel and a second member telescopically engaged with said first member and extending to a pivot end and being moveable along a first predetermined telescoping collapse path in response to an impacting force acting on said steering wheel supporting end and having a cam-follower surface in fixed relation to said steering wheel supporting end;

a cam surface spaced from said steering column and slidably engaging said cam-follower surface, said cam surface and said cam-follower surface configured to cooperate during movement of said steering column to define a second predetermined substantially horizontal collapse path in continuous fixed relation to said first predetermined telescoping collapse path to guide said steering column in rotation upwardly about said pivot end in response to movement of said steering wheel supporting end toward said pivot end; and a rake bracket selectively fixedly engageable with said steering column wherein said cam-follower surface is further defined by said rake bracket, said cam surface is defined by an instrument panel support structure sloping downwardly along one of said first predetermined telescoping collapse path and said second predetermined substantially horizontal collapse paths toward said pivot end.

* * * * *